June 22, 1937.  P. VAN CLEEF  2,084,878
TAPE AND METHOD OF MAKING THE SAME
Filed May 25, 1936
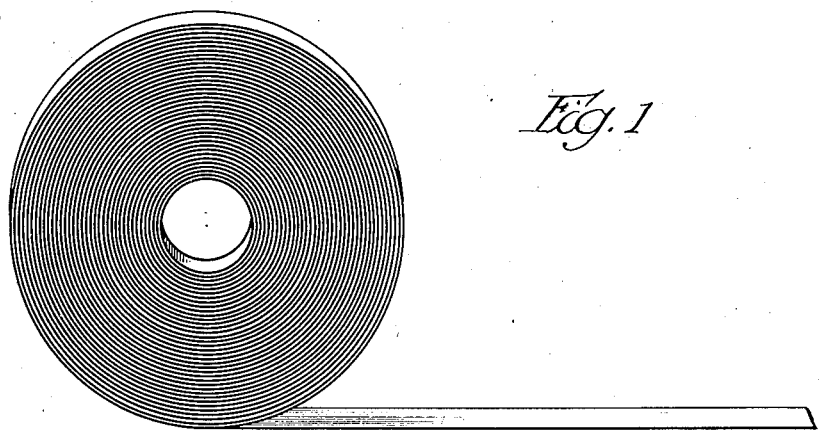
Fig. 1
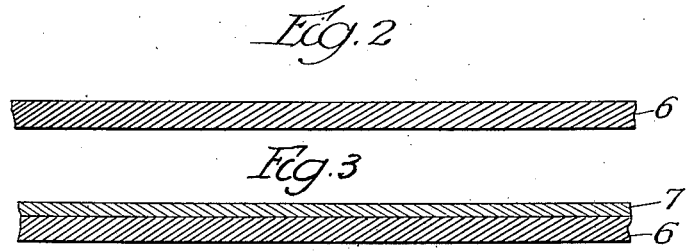
Fig. 2
Fig. 3
Fig. 4
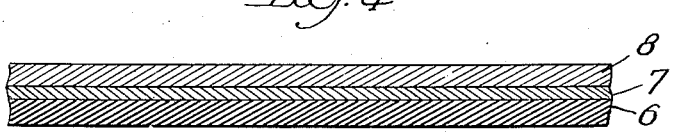
Fig. 5
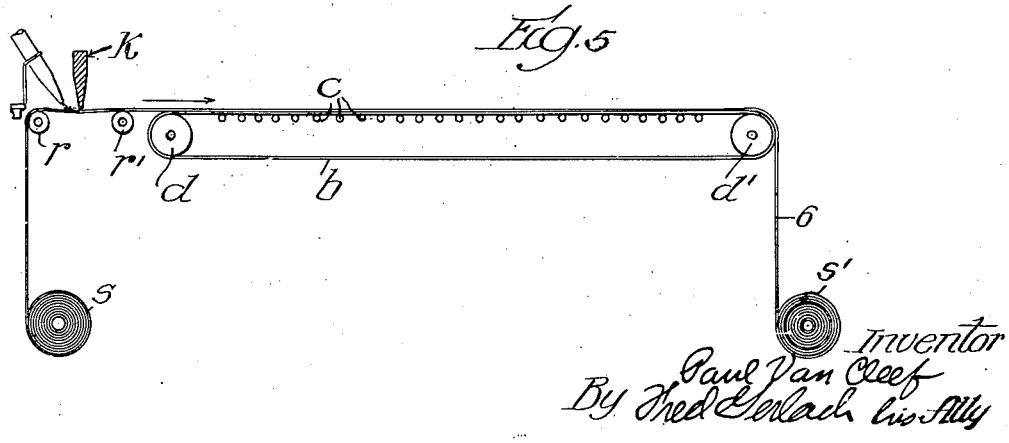
Inventor
Paul Van Cleef
By Fred Gerlach his Atty Patented June 22, 1937

2,084,878

UNITED STATES PATENT OFFICE 2,084,878

TAPE AND METHOD OF MAKING THE SAME

Paul Van Cleef, Chicago, Ill., assignor to Van Cleef Bros., Chicago, Ill., a partnership composed of Noah Van Cleef, Felix Van Cleef, Maxime Van Cleef, and Paul Van Cleef Application May 25, 1936, Serial No. 81,649

10 Claims. (Cl. 91—68)

The present invention relates generally to tape. More particluarly the invention relates to that type of tape which is merchandised or supplied in roll form, comprises a long narrow strip of flexible material and a coating or film of pressure sensitive rubber base adhesive on one face of the strip, and is adapted to be used as a masking tape, or a wrapping or winding for electrical conductors and terminals, and also to be used for sealing purposes and in other ways and for other purposes.

One object of the invention is to provide a tape of this type which can be stretched farther and is a better insulator than, and is generally an improvement upon, previously designed tapes of the same general character and for the same purpose by reason of the fact that the narrow strip to one face of which is applied the coating or film of pressure sensitive rubber base adhesive is formed of material which is known commercially as "Pliofilm".

Another object of the invention is to provide a tape of the last mentioned type and character in which the coating or film of pressure sensitive rubber base adhesive is attached to the "Pliofilm" strip by a bonding coat so that it is not likely to be pulled or torn away from the strip when the tape is unrolled.

A further object of the invention is to provide a tape of the type under consideration in which the bonding coat comprises a mixture of rubber and "Pliofilm".

A still further object of the invention is to provide a tape which may be manufactured at a low and reasonable cost, and embodies certain characteristics and properties which are not found in other tapes of the same general type.

In addition it is contemplated as one of the objects of the invention to provide a novel and simple method of making or manufacturing tape of the aforementioned character.

Other objects of the invention and the various advantages and characteristics of the present tape and its method of manufacture will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a perspective of a roll of tape embodying the invention;

Figure 2 is a longitudinal sectional view of the narrow "Pliofilm" strip before application of the bonding coat and the coating or film of pressure sensitive rubber base adhesive;

Figure 3 is a longitudinal sectional view showing the strip after application of the bonding coat;

Figure 4 is a longitudinal sectional view of the finished tape; and

Figure 5 is a diagrammatic side elevation of an apparatus for use in applying the bonding coat to the "Pliofilm" strip in connection with the manufacture or fabrication of the tape.

The tape which forms the subject matter of the invention is adapted for general use in that it is usable as a masking tape or a wrapping or winding for electrical conductors and terminals, and it is also usable for sealing and other purposes. It is adapted to be merchandised or supplied in roll form, as shown in Figure 1, and consists of a long narrow strip 6, a bonding coat 7 on one face or side of the strip 6, and a coating or film 8 of pressure sensitive rubber base adhesive on the bonding coat 7.

The strip 6 constitutes the base of the tape and is formed of "Pliofilm" material. The latter is described in United States Letters Patent No. 1,989,632, granted January 29, 1935, to William C. Calvert, and is a certain form or species of rubber hydrohalide. It is characterized by the fact that it is transparent as well as moisture-proof. It is further characterized by the fact that it has exceptionally high insulating properties and its dielectric strength is much greater than moisture-proof "Cellophane" or like material. By reason of the fact that the strip 6 is moisture-proof and highly elastic, the tape is both practical and extremely efficient when used for masking purposes. When the tape is used for masking purposes it may be applied in a curved manner to flat surfaces due to the fact that it stretches readily. Because "Pliofilm" is moisture-proof the tape is resistant to water. For the same reason the tape may be readily used for sealing cans and other packages. The tape is also resistant to oils and certain organic solvents which may be used in paint, lacquer and other finishing materials. By reason of the fact that "Pliofilm" is a highly efficient insulator even in an atmosphere of high humidity, the tape may be used to form an insulating wrapping or winding for electrical conductors and terminals.

Preferably the "Pliofilm" base strip 6 is between .001 and .002 of an inch in thickness.

The bonding coat 7 is in the form of a mixture of rubber and "Pliofilm" and serves to connect or secure the coating or film 8 of pressure sensitive rubber base adhesive to the "Pliofilm" base strip 6 in such manner that it cannot be pulled or stripped from the base strip when the tape is unwound. It is applied to the "Pliofilm" base strip 6 while in liquid form and is formed of two solutions which are mixed together by a stirring operation. The first solution is formed by mixing one ounce (weight) of "Pliofilm" with ten liquid ounces of acetylene tetrachloride, or any other chlorinated solvent for "Pliofilm." The second solution is formed by mixing one ounce (weight) of plasticized or milled crepe rubber with approximately four liquid ounces of benzol or carbon tetrachloride. The benzol or carbon tetrachloride is a solvent for the rubber. When the two solutions are stirred together the liquid "Pliofilm" becomes mixed with the liquid rubber. The mixture of the two solutions is applied or spread over one face of the "Pliofilm" base strip 6 in any suitable manner or by way of an apparatus such, for example, as that shown in Figure 5. This apparatus consists of a horizontally extending endless belt b, a pair of drums d and d' for supporting the belt, a series of heating coils c beneath the upper reach of the belt, supply and take-up spools s and s' for the "Pliofilm" base strip 6, a pair of horizontally positioned rolls r and r' in front of the drum d, and a doctor knife k between the two rolls r and r'. The base strip 6 of "Pliofilm" as shown in Figure 5, travels upwardly from the supply spool s and then passes over the rolls r and r' and under the doctor knife k. From the roll r' the strip travels over the top reach of the belt c and then downwards from the drum d' to the take up spool s'. The latter is driven in any suitable manner so as to effect continuous feed of the strip 6. The belt b is driven in any suitable manner so that it travels at the same speed as the strip 6. The mixture of the two solutions which serve to form the bonding coat 7 is applied to the base strip directly in front of the doctor knife k. During feed or travel of the strip 6 between the spools s and s', the doctor knife k spreads the coat forming mixture over the strip 6. As the strip with the bonding coat travels with the upper reach of the belt b over the heating coils c the two solvents, that is, the acetylene tetrachloride and the benzol or carbon tetrachloride, are evaporated. Upon evaporation of the solvents a coat consisting of an admixture of "Pliofilm" and rubber remains. When the mixture of the two solutions comes in contact with the "Pliofilm" base strip 6 the acetylene tetrachloride, which as hereinbefore pointed out, is a solvent for "Pliofilm", comes in contact with and softens the top face of the base strip. As the result of this there is a bonding or amalgamation of the "Pliofilm" of the coat forming mixture and the "Pliofilm" strip 6 upon evaporation of the acetylene tetrachloride.

The pressure sensitive coating or film 8 serves as an anchoring or sticking medium for the tape. It is applied while in liquid form to the bonding coat 7 and is made from a solution comprising three ounces of plasticized or milled crepe rubber; two ounces of burgundy pitch, olibanum or any other suitable resinous material, and an adequate or proper amount of solvent such as naphtha. The coating or film forming solution is spread over the bonding coat 7 by way of any suitable spreading machine and after hardening or drying of the bonding coat. Upon drying or evaporation of the naphtha, that is the solvent, a permanently tacky pressure sensitive rubber base coating or film results and this coating or film, due to the amalgamation of the rubber therein with the rubber in the bonding coat 7, is substantially permanently fixed or attached to the "Pliofilm" strip 6. When the naphtha of the coating or film forming solution comes in contact with the milled crepe rubber of the bonding coat 7 the rubber softens and becomes bonded or united to the plasticized or milled crepe rubber of the solution. As the result of the amalgamation or adhesion of the coating or film 8 with the bonding coat 7 there is no likelihood of the pressure sensitive rubber base coating or film being stripped or pulled from the "Pliofilm" base strip 6 when the tape is unrolled.

The herein described tape may be manufactured at a low and reasonable cost. It is extremely efficient when used for masking or wrapping purposes, and if desired may be made with colored "Pliofilm" for decorative purposes. Because of the application of the bonding coat 7 and the pressure sensitive rubber base coating or film 8 to the "Pliofilm" strip 6 the tape as a whole is capable of stretching to a much greater extent than plain "Pliofilm". In addition the tape sets to a greater extent or degree after being stretched and hence when applied to a surface while in a stretched condition it is not likely to strip or pull itself from the surface.

The invention is not to be understood as restricted to the details set forth, since these may be modified within the scope of the appended claims, without departing from the spirit and scope of the invention.

Having thus described the invention, what I claim as new and desire to secure by Letters Patent is:

1. As a new article of manufacture, a tape comprising a strip of rubber hydrohalide and a coating of pressure sensitive rubber base adhesive on one face of the strip.

2. As a new article of manufacture, a tape comprising a narrow strip formed of rubber hydrohalide and having on only one face thereof a thin coating of permanently tacky pressure sensitive rubber base adhesive.

3. As a new article of manufacture, a tape comprising a strip of rubber hydrohalide, a bonding coat with rubber therein fixed to one face of the strip, and a coating or film of pressure sensitive rubber base adhesive on the bonding coat.

4. As a new article of manufacture, a tape comprising a narrow strip of rubber hydrohalide, a bonding coat with crepe rubber therein united to one face of the strip, and a coating of film or permanently tacky pressure sensitive crepe rubber adhesive on the bonding coat.

5. As a new article of manufacture, a tape comprising a strip of rubber hydrohalide, a bonding coat extending over one face of the strip and consisting of a mixture of "Pliofilm" type material and rubber, and a coating of pressure sensitive rubber base adhesive on the bonding coat.

6. That improvement in the manufacture of tape which comprises applying to one face of a strip of rubber hydrohalide a solution containing rubber hydrohalide and a solvent therefor and also crepe rubber and a solvent therefor, and then after dissipation of the solvents from the solution, applying to the residual coat a coating of pressure sensitive rubber base adhesive.

7. That improvement in the manufacture of tape which comprises applying to one face of a strip of rubber hydrohalide, a liquid solution consisting of rubber hydrohalide and a solvent therefor and also rubber and a solvent therefor, and then after dissipation of the solvents from the solution applying to the residual coat a coating of pressure sensitive rubber base adhesive.

8. That improvement in the manufacture of tape which consists in applying to one face of a strip of rubber hydrohalide a facing consisting of a solution of halogenated rubber and acetylene tetrachloride and milled crepe rubber and a solvent therefor, and then after dissipation of the solvents applying to the residual facing or coat a coating or film of pressure sensitive rubber base adhesive.

9. That improvement in the manufacture of tape which comprises applying to a strip of rubber hydrohalide a bonding coat with milled crepe rubber therein, then spreading over the coat a solution of milled crepe rubber, a resinous material and a solvent for said rubber and material, and finally dissipating the solvent so as to form a pressure sensitive rubber base adhesive which is united with the bonding coat.

10. That improvement in the manufacture of tape which consists in applying to one face of a strip of rubber hydrohalide a solution of rubber hydrohalide and a solvent therefor and also crepe rubber and a solvent therefor, then after dissipation of the solvents of said solution, applying to the residual coat a solution of crepe rubber and resinous material and a solvent for the last two mentioned substances, and then dissipating the solvent of the second mentioned solution in order to form a pressure sensitive rubber base adhesive coating which is united to the strip through the medium of said residual coat.

PAUL VAN CLEEF.